(12) United States Patent
Katrak et al.

(10) Patent No.: US 7,200,469 B2
(45) Date of Patent: Apr. 3, 2007

(54) APPARATUS AND METHOD FOR PROCESSING SENSOR OUTPUT SIGNALS

(75) Inventors: Kerfegar K. Katrak, Fenton, MI (US); Paul A. Bauerle, Fenton, MI (US); Alan H. Canavan, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/811,377

(22) Filed: Mar. 25, 2004

(65) Prior Publication Data

US 2005/0216134 A1  Sep. 29, 2005

(51) Int. Cl.
G01M 19/00 (2006.01)
F02D 11/00 (2006.01)
(52) U.S. Cl. .................. 701/1; 123/349; 340/669
(58) Field of Classification Search ................ 701/1, 701/34; 123/349, 363, 370, 376; 74/473.13, 74/478, 482; 340/669, 670, 679
See application file for complete search history.

(56) References Cited

U.S. PATENT DOCUMENTS

| | | | | |
|---|---|---|---|---|
| 5,157,956 A | * | 10/1992 | Isaji et al. ................. 73/1.75 |
| 5,320,076 A | * | 6/1994 | Reppich et al. ............. 123/399 |
| 5,508,594 A | * | 4/1996 | Underwood et al. ........ 318/139 |
| 6,499,462 B1 | * | 12/2002 | Pursifull ...................... 123/396 |
| 6,513,492 B1 | * | 2/2003 | Bauerle et al. ............. 123/396 |
| 6,751,544 B2 | * | 6/2004 | Hashimoto et al. ......... 701/107 |

* cited by examiner

Primary Examiner—Dalena Tran
(74) Attorney, Agent, or Firm—Christopher DeVries (57) ABSTRACT

A method and apparatus are provided for generating a vehicle control signal that controls a function of a vehicle device associated with a sensed event. The apparatus comprises a first sensor that is configured to provide a first sensor output signal having a first magnitude that approximately corresponds to a sensed event with a first accuracy and second sensor that is configured to provide a second sensor output signal having a second magnitude that approximately corresponds to the sensed event with a second accuracy that is less than the first level of accuracy. The apparatus also comprises a processor that is configured to receive the first sensor output signal, receive the second sensor output signal, calculate a magnitude for the vehicle control signal based on an average of a weighted value of the first magnitude and the second magnitude, generate the vehicle control signal with the magnitude, and provide the vehicle control signal to the vehicle device.

23 Claims, 4 Drawing Sheets

APPARATUS AND METHOD FOR PROCESSING SENSOR OUTPUT SIGNALS

TECHNICAL FIELD

The present invention generally relates to signal processing, and more particularly to methods and apparatus for processing the output signals of the sensors of a control system that are monitoring the same event.

BACKGROUND

Many kinds of mechanical equipment utilize electrical sensors or transducers to provide electrical output signals for measuring parameters and/or identifying physical events such as the displacement of a movable part. For instance, modem internal combustion engine designs utilize Electronic Throttle Control (ETC) to adjust the fuel injection, the engine spark and the amount of airflow through an intake manifold of an engine in response to sensor monitored operator variations of a movable accelerator. Such ETC systems provide many advantages such as reduced costs, improved simplicity, reduced engine noise, throttle command conditioning for emissions reduction and/or torque based control functions. Operator adjustment of the accelerator position or displacement is typically accomplished through the use of an accelerator-input mechanism such as a foot pedal.

The accelerator input mechanism is mechanically coupled to multiple sensors that in turn provide output signals having magnitudes indicative of the accelerator position or displacement to an ETC microprocessor. The magnitudes of such sensor output signals are utilized by the microprocessor to generate control signals for enabling the hardware of the engine to provide the operating levels indicated by the positioning of the accelerator input mechanism. Multiple or "redundant" input sensors are presently utilized to sense a particular parameter such as the amount of accelerator pedal depression to improve sensing reliability. Redundant accelerator sensors of the same technology type and associated hardware have become standard in ETC systems with the multiple sensors being processed to ensure secure pedal and throttle signals.

ETC systems compute correlation errors to monitor the condition of the redundant accelerator sensors so that corrective action can be taken if a sensor is failing or has failed by opening up or shorting out for instance. A correlation error is a function of the difference in the instantaneous magnitudes of the output signals from the sensors. Some prior art ETC systems monitor and store the correlation error of such sensors only when the accelerator pedal is released, for instance. Thus a correlation error for these sensors is learned only at one accelerator position such as at idle when the throttle is closed. Accordingly the correlation error value is undesirably only intermittently monitored by such prior art systems to determine accelerator pedal sensor reliability.

Position sensors of reasonable cost provide sensor output signal magnitude variations that fall short of a major failure and thus have small correlation errors. Such variations can occur because of the drop in magnitude of a supply or reference voltage for at least one of the sensors that has nothing to do with the condition of the sensor but results from an increase in the electrical load on the supply, for example. Expensive prior art solutions include either providing separate and independent dedicated reference voltage supplies for each pedal sensor or providing a high precision common reference voltage supply. If the sensors of some prior art systems are configured to have characteristics with opposite slopes a change in the reference voltage can differently affect the outputs levels of the sensors thereby initiating false error codes.

Also normal wear and tear and manufacturing tolerances can cause sensors of the same type to perform differently to some extent over time. Accordingly some variation in the outputs of the sensors should be tolerated so that the foregoing corrective actions are not unnecessarily initiated. To address this problem some prior art systems require expensive sensors that are manufactured with restrictive tolerances so that their correlation errors are minimized. Other prior art systems require that three or more sensors be used to measure the same parameter so that a malfunctioning sensor can be identified because its output level is different from the output levels of the other sensors. Both of the foregoing solutions tend to be undesirably expensive.

In view of the foregoing, it should be appreciated that it is desirable to provide inexpensive methods and apparatus for providing continuous, accurate and reliable detection of redundant sensors to facilitate notification that a sensor either is failing or has failed. Moreover it is important that such systems be tolerant of acceptable correlation errors which can result from physical variations in the sensors and/or a minor fault in a sensor. This enables such sensors to have less restrictive tolerances. Thus the sensors can be less expensive than otherwise would be the case thereby facilitating the use of existing sensors. Furthermore, it is desirable that such methods and apparatus are relatively immune to disturbances, noise and/or temporary changes in the magnitude of the reference voltage for the sensors. It is further desirable that such methods and apparatus require either no or only minimal changes in the other portions of the overall system such as either wiring changes, or the redesign of presently used reference voltage supplies.

Furthermore, other desirable features and characteristics of the present invention will become apparent from the subsequent brief summary, detailed description, appended claims, and abstract, taken in conjunction with the accompanying drawings and the foregoing technical field and background.

BRIEF SUMMARY

An apparatus is provided for generating a vehicle control signal that controls a function of a vehicle device associated with a sensed event. The apparatus comprises a first sensor that is configured to provide a first sensor output signal having a first magnitude that approximately corresponds to a sensed event with a first accuracy and second sensor that is configured to provide a second sensor output signal having a second magnitude that approximately corresponds to the sensed event with a second accuracy that is less than the first level of accuracy. The apparatus also comprises a processor that is configured to receive the first sensor output signal, receive the second sensor output signal, calculate a magnitude for the vehicle control signal based on an average of a weighted value of the first magnitude and the second magnitude, generate the vehicle control signal with the magnitude, and provide the vehicle control signal to the vehicle device.

In addition, a method is provided for generating a vehicle control signal that controls a function of a vehicle device associated with a sensed event. The method comprises the steps of producing a first sensor output signal having a first magnitude that approximately corresponds to the sensed event with a first level of accuracy and producing a second sensor output signal having a second magnitude that approximately corresponds to the sensed event with a second level of accuracy that is less than the first level of accuracy. Furthermore, the method comprises calculating a magnitude for the vehicle control signal based on an average of a weighted value of the first magnitude of the first sensor output signal and the second magnitude of the second sensor output signal, generating the vehicle control signal with the magnitude, and providing the vehicle control signal to the vehicle device for controlling the function of the vehicle device associated with the sensed event monitored by the first sensor and the second sensor in response to the vehicle output signal with the magnitude.

BRIEF DESCRIPTION OF THE DRAWINGS

The present invention will hereinafter be described in conjunction with the appended drawing figures, wherein like reference numbers denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
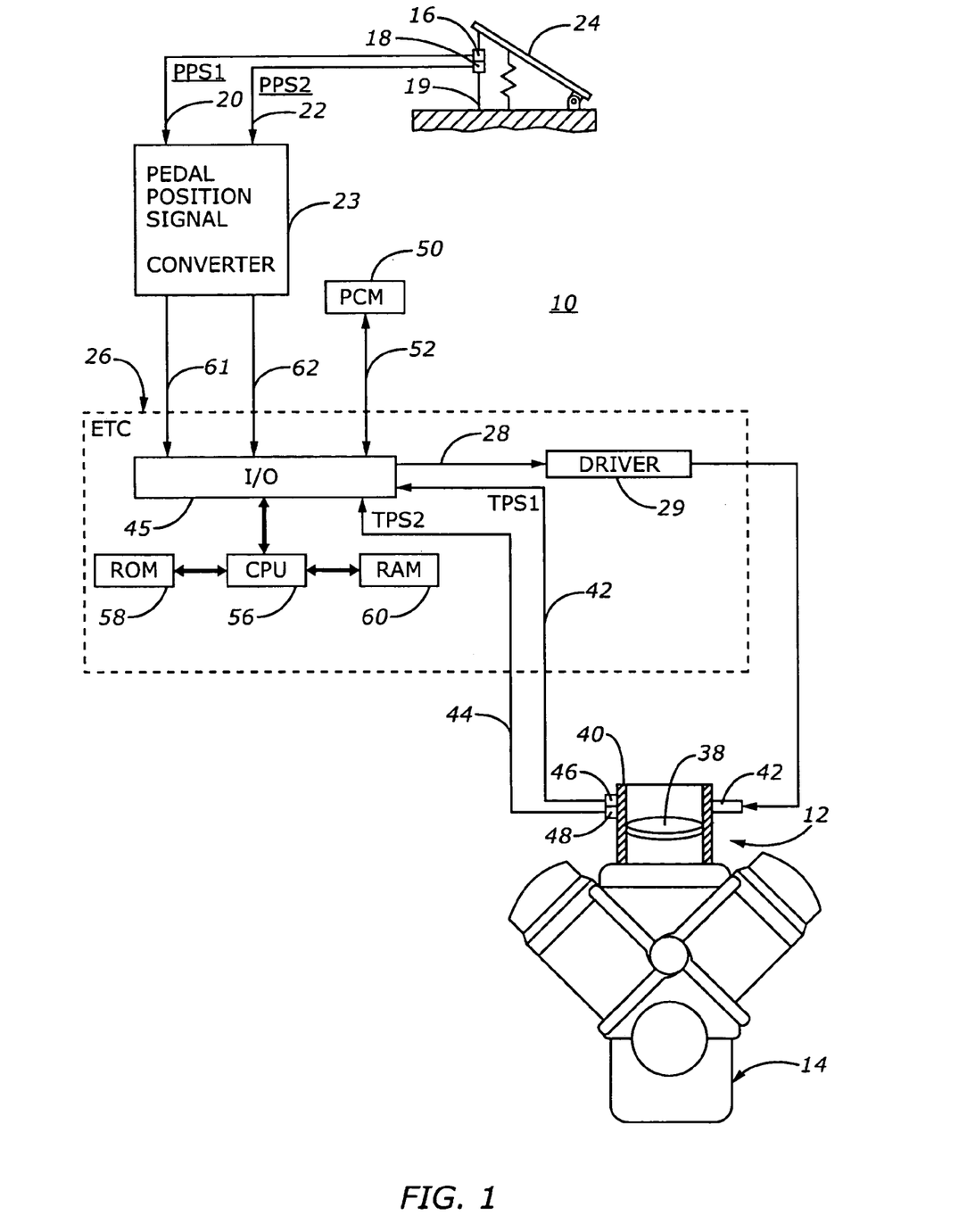
FIG. 1 is a simplified general diagram of an automotive system having electronic throttle control for adjusting the throttle of a vehicle engine in which the preferred embodiment of this invention is incorporated.

Referring to FIG. 1, an apparatus 10 in accordance with an exemplary embodiment of the present invention is illustrated for adjusting a throttle 12 of an internal combustion engine 14. Apparatus 10 includes a pair of input or pedal mechanism position sensors 16 and 18 that are respectively configured to provide analog output signals PPS1 and PPS2 on respective conductors or lines 20 and 22 that are connected to inputs of pedal position converter block 23. Analog sensors 16 and 18 can be rotary potentiometers driven together by a common shaft 19 that is turned by accelerator pedal 24. The redundant sensor output signals PPS1 and PPS2 have magnitudes that approximately correspond to a sensed physical event such as the movement of accelerator pedal 24. An operator (not shown) requests an operating level for engine 14 by operating an input mechanism such as by depressing the accelerator pedal 24, for instance. Input sensors 16 and 18 produce sensor output signals of changing magnitude as the operator alters the position of the input mechanism or device, such as accelerator pedal 24. Any of a number of input mechanisms can be used in accordance with the present invention, such as a foot pedal 24, a hand pedal, a joystick, a lever or a trackball. Pedal position signal converter 23 processes analog signal PPS1 and PPS2 to respectively provide corresponding digital signals PPS1_RAW and PPS2_RAW.

Apparatus 10 also includes an Electronic Throttle Control (ETC) system 26 for generating a throttle output control signal on line 28, which is connected through driver 29 to throttle 12. Throttle 12 can have an electronically controlled intake air valve such as a butterfly or rotary valve 38, disposed within an intake bore 40. An electromechanical actuator, such as a direct current (DC) brushless step motor 42, is mechanically linked to valve 38 by a rotatable shaft (not shown). Valve 38 is rotated by motor 42 in response to the throttle output control signal to adjust the airflow rate through intake bore 40 of engine 14. The rotational position of the shaft and the corresponding flow rate of air to the engine 14 are controlled through the variation of the magnitude of the throttle control signal which is issued by ETC system 26. ETC 26 receives input signals TPS1 and TPS2 on lines 42 and 44 that are connected to input/output "I/O" module 45 from rotary potentiometers 46 and 48. TPS1 and TPS2 have voltage magnitudes indicating the rotational position of the valve 38. Powertrain control module "PCM" 50 also provides signals through a bidirectional control link 52 to I/O module 45 of ETC 26. ETC 26 also includes standard micro-controller or microprocessor elements such as a central processing unit or units designated as CPU 56, read only memory ROM 58 and random access memory RAM 60. ETC 26 uses an algorithm stored in ROM 58 to process the PPS1_RAW and PPS2_RAW signals from converter 23 to generate the throttle output control signal on line 28. Converter 23 is connected by lines 61 and 62 to I/O module 45 that stores PPS1_RAW and PPS2_RAW in RAM 60 so that they can be processed.

Figure 2:
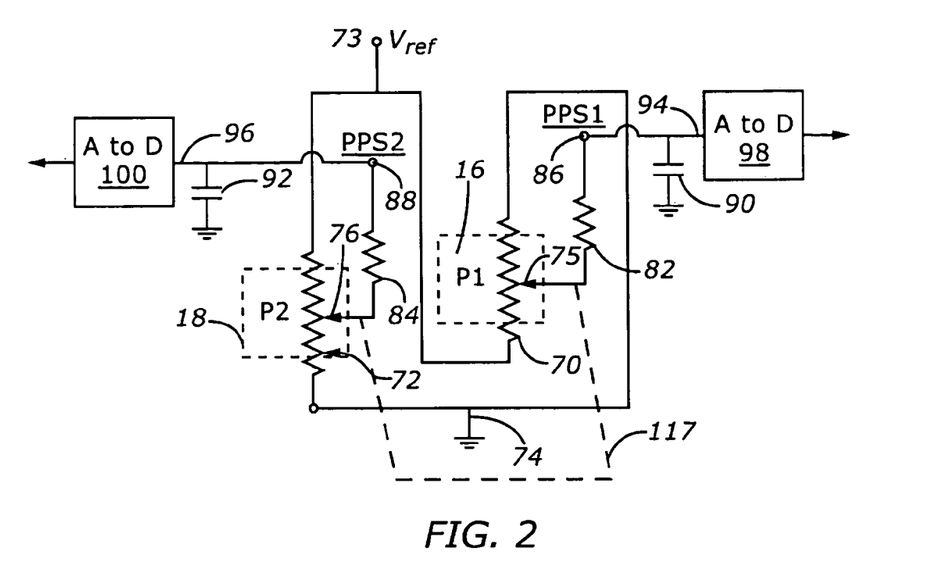
FIG. 2 is a circuit diagram of the pedal position sensors of FIG. 1.

FIG. 2 shows a schematic diagram of input sensors or variable rotary potentiometers P1 and P2 identified by respective reference numbers 16 and 18 having respective main resistive elements 70 and 72 that are each connected between a reference voltage supply, Vref 73 and ground 74. Vref can be on the order of 5 volts in this embodiment. The reference voltage is applied across P1 16 with a polarity that is the reverse of the voltage applied to P2 18. Thus the slopes of the converter output signals PPS1_RAW and PPS2_RAW shown in FIG. 3 that are derived from respective sensors 16 and 18 are opposite to each other.

Elements 70 and 72 can be made of an insulating substrate supporting a resistive ink material having a mixture that is only approximately uniform in dimensions and resistivity. Potentiometer sliders 75 and 76 are mechanically coupled by shaft 19 to pedal 24 of FIG. 1 so that they are moved together along elements 70 and 72 by movement of pedal 24. Sliders or movable members 75 and 76 are respectively connected through resistors 82 and 84 to output terminals 86 and 88. Sliders 75 and 76 are simultaneously operated together or rotated by the shaft 19 shown in FIG. 1 when pedal 24 is moved by the operator to provide analog voltages PPS1 and PPS2 at respective output terminals 86 and 88. The magnitudes of PPS1 and PPS2 are representative of the positions of accelerator pedal 24.

It is desired that the magnitudes of the PPS1 and PPS2 voltages at terminals 86 and 88 have predetermined characteristics. However because of manufacturing and material tolerances and normal wear and tear the corresponding instantaneous resistances selected by members 75 and 76 differ from each other by at least a small amount even under normal operating conditions. This difference in resistance results in a proportional difference in the magnitudes of the direct current voltages PPS1 and PPS2 at terminals 86 and 88. A correlation error between the corresponding output voltage magnitudes at terminals 86 and 88 having a value greater than a predetermined threshold magnitude can indicate that either at least one of the sensors 16 or 18 is either failing or has failed. The correlation error greater than the predetermined threshold can also be the result of a noise signal on Vref terminal 73, for instance. The signals at terminals 86 and 88 are stored on respective capacitors 90 and 92. The resulting filtered analog signals are applied to input terminals 94 and 96 of respective analog-to-digital "A to D" converters 98 and 100 that can form part of pedal position converter 23. Converter 23 processes PPS1 and PPS2 and provides corresponding digital signals PPS1_RAW and PPS2_RAW to I/O module 45 of ETC block 26 of FIG. 1 that is connected to CPU 56. As will be described in greater detail, a weighted average of the magnitudes of signals derived from the sensors is calculated by CPU 56 to provide the throttle output control signal on line 28 of FIG. 1.

Figure 3:
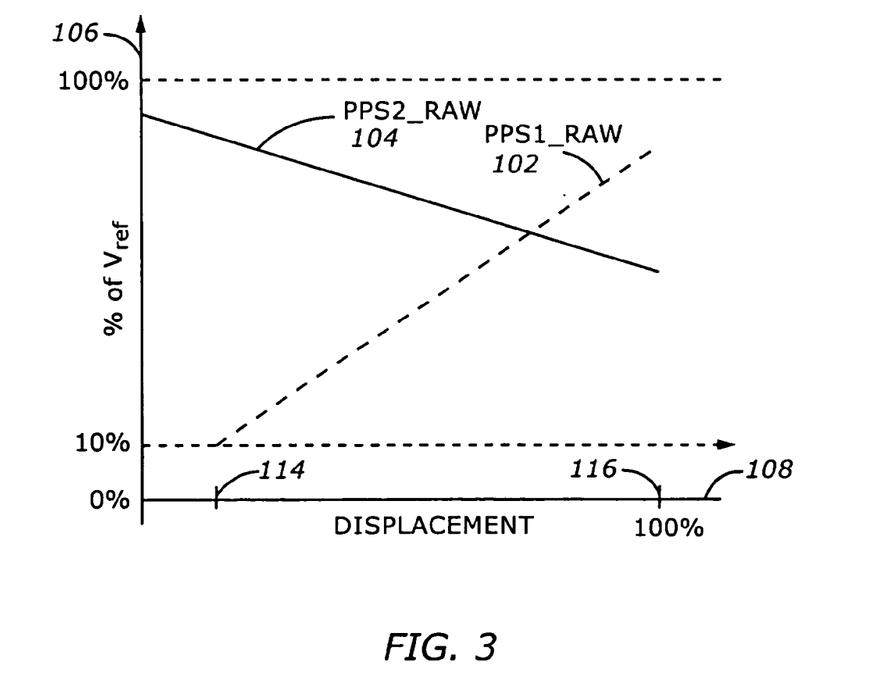
FIG. 3 shows the relationship between the magnitudes of the output signals of the pedal position signal converter block of FIG. 1, the percentage of pedal displacement and the magnitude of a sensor reference voltage.

FIG. 3 illustrates a representative set of characteristic curves 102 and 104 for PPS1_RAW and PPS2_RAW of sensors 16 and 18 that measures the percent "%" of Vref on the ordinate axis 106 as a function of pedal displacement percentage on abscissa axis 108. Each of the resistors 82 and 84 as well as the potentiometers 16 and 18 can have distinct resistance values to provide unequal sensor-to-sensor slopes and offset. The magnitude of the voltage PPS1_RAW 102 varies inversely with the magnitude of PPS2_RAW 104. The positive and negative slopes of respective curves 102 and 104 vary with the resistance of resistors 70 and 72. Also the offset for curves 102 and 104 corresponding to the minimum pedal displacement corresponding to point 114 and the maximum pedal displacement corresponding to point 116 on axis 108 can vary from sensor to sensor. This variation in offset is due to intentional differences in the resistances of resistors 82 and 84 and of resistors 70 and 72. For example PPS1_RAW derived from sensor 16 can have an operating range of 10% to 84% of Vref and a positive slope of "one" as indicated by curve 102. PPS2_RAW derived from sensor 18 can have an operating range of 90% to 58% of Vref and a negative slope of "one-half" as indicated by curve 104. Thus the magnitude of PPS2_RAW tends to be more sensitive to changes in Vref than PPS1_RAW. The sensor sliders 75 and 76 are connected and moved together by the pedal 24 and shaft 19, as indicated by dashed line 117 of FIG. 2. Because of the different slopes of curves 102 and 104 the rates of change "ROC" of the magnitudes of the sensor signals vary between the output signals of sensors 16 and 18 in response to the same rate of change of the pedal displacement.

The unequal slopes, polarities and offsets of PPS1_RAW and PPS2_RAW are useful for sensor fault detection such as sensor shorts to a common voltage or ground for instance. The unequal resistance values also provide for the detection of internal short conditions of the sensors because such shorts will cause a lack of correlation in the sensor output signal values that may be detected as a fault condition. Detection of other fault conditions through utilization of the present inventions will be apparent to those of ordinary skill in the art.

Figure 4:
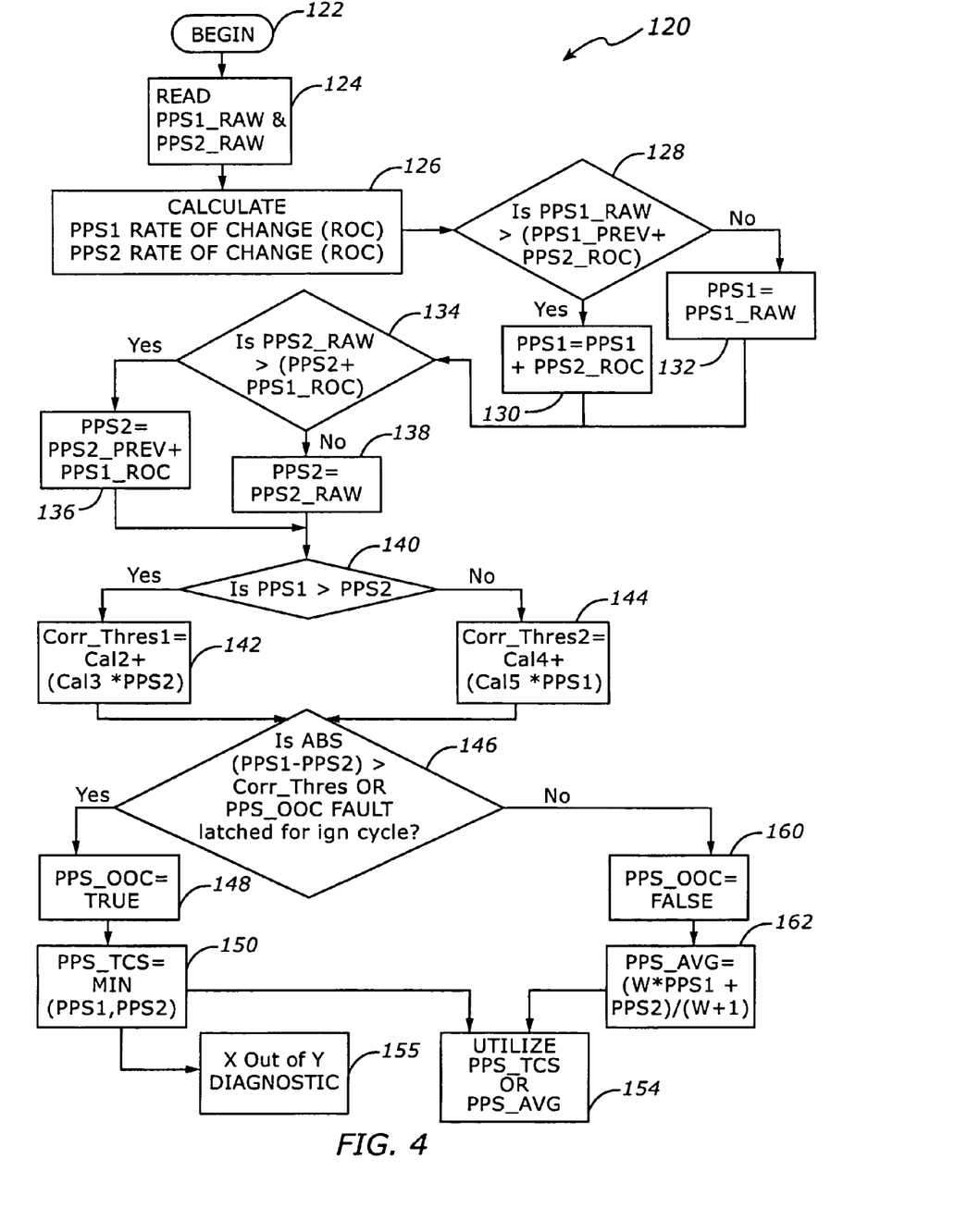
FIG. 4 is a flow chart of a method of another embodiment of the invention.

A method 120 for monitoring the conditions of sensors 16 and 18, and facilitating the anticipation and identification of sensor failure is illustrated in the flow chart of FIG. 4 according to another preferred exemplary embodiment of the present invention. The apparatus 10 of FIGS. 1 and 2 effectuates method 120. Specifically, the processor or processors and memories in ETC block 26 of FIG. 1 are configured to perform the steps of method 120. The series of steps or algorithm carried out in ETC 26 can be stored as a sequence of controller steps in ROM 58. ETC 36 performs the processing of pedal displacement information from sensors 16 and 18, which provide the throttle control function of method 120. ETC 36 performs other operations in addition to the throttle control function. Specifically ETC 26 also performs spark and fuel injector control as known in the art.

Generally method 12 has sensors "in correlation" and sensors "out of correlation" modes of operation. During normal sensors "in-correlation" conditions the performance of pedal displacement method 120 of FIG. 4 calculates the magnitude of a pedal position control output signal for operating valve 38 of throttle 12, shown in FIG. 1. The magnitude of the pedal position control signal is desired to be proportional to the displacement of pedal 24. Per method 120 ETC 26 first verifies that PPS1_RAW and PPS2_RAW are within desired ranges as will be explained later in greater detail. For the purpose of the following explanation sensor 16 is assumed to be a more accurate sensor than sensor 18, thus enabling sensor 18 be less expensive than sensor 16. Sensor 16 is the control sensor and PPS1_RAW is the control signal and sensor 18 is the diagnostic sensor and PPS2_RAW is the diagnostic signal. PPS1_RAW will be weighted more than PPS2_RAW to have more of contribution than PPS2_RAW to the normal pedal position signal PPS_AVG. PPS_AVG is a function of the average of a weighted value of PPS1_RAW and of a non-weighted PPS2_RAW. The weighting factor "W" for PPS1 is greater than 1 and not necessarily limited to integer values. The relative weighting of sensor signal PPS1_RAW minimizes sensitivity of PPS_AVG to downward shifts in Vref and enables the diagnostic sensor to be less expensive than otherwise would be the case, as will be explained later.

The sensors "out of correlation" mode of method 120 is initiated if one of the sensor signals PPS1 or PPS2 is suspected or found to be faulty for instance. Then a sensor out of correlation "OOC" flag is initiated and the throttle control signal PPS_TCS is arranged to have a magnitude equal to the smallest magnitude of PPS1 and PPS2. PPS_TCS is then used in place of PPS_AVG for throttle control under OOC conditions so that a vehicle including engine 14 for instance does not have too much acceleration, which may be noticeable to a driver. It is important that at least a minimum number of faults occur over a predetermined time period before a severe fault condition is identified or flagged and corrective action is taken because such faults may be only temporary.

More specifically, a pedal displacement processing cycle of method 120 of FIG. 4 begins with step 122 in response to an interrupt signal. This interrupt signal causes I/O module 45 of FIG. 1 to read per step 124 and deliver to CPU 56 the values of PPS1_RAW and PPS2_RAW from lines 61 and 62 that are connected to the outputs of pedal position signal converter 23. PPS1_RAW and PPS2_RAW are then normalized by a technique that is known in the art so that their characteristic curves have approximately the same slopes and ranges between 0% and 100% pedal displacement. Normalizing however tends to amplify any errors in the output signal of sensor 18 caused by shifts in Vref for instance. The rate of change "ROC" of PPS1 is "PPS1_ROC", which is calculated in step 126 by utilizing the following formula: PPS1_ROC=Cal 1+MAX (0, (PPS1_RAW−PPS1_PREV)). Cal 1 is a small calibratable offset that is used to ensure normal sensor granularity or coherence between PPS1_RAW and PPS2_RAW so as to not artificially limit PPSx where x is 1 or 2. The "0" indicates that the lower limit of PPS1_ROC is limited to "0". PPS1_PREV is a value derived from PPS1 from the previous pedal displacement processing cycle. Also the ROC of PPS2 or "PPS2_ROC" is calculated in step 126 utilizing the formula PPS2_ROC=Cal 1+MAX(0,(PPS_2_RAW−PPS2_PREV)). PPS2_PREV is a value derived from PPS2 from the previous cycle. Cal 1 can be split into two separate "cals" for sensors 16 and 18.

Since the same shaft 19 drives both sensors 16 and 18 the ROCs of PPS1 and PPS2 should be the same or correspond to each other. Thus a sudden change in the ROC of control sensor 16 without a corresponding change in the ROC of diagnostic sensor 18 can be identified as a potential fault condition perhaps requiring action to be taken before there is a problem, for instance. Hence decision step 128 determines whether PPS1_RAW is greater than PPS1_PREV+PPS2_ROC. If the answer is Yes then PPS1 is limited or reset to the lower value of PPS1_PREV+PPS2_ROC as indicated by block 130 so that a throttle control signal having too high of a magnitude is not supplied to throttle 12. Alternatively, if the answer is No then PPS1_RAW is verified and allowed to become the new value of PPS1 as shown in block 132.

Similarly, decision step 134 determines whether PPS_2_RAW is greater than PPS2_PREV+PPS1_ROC. Again if this is the case then a fault condition may have occurred causing a Yes to be issued from step 134 and the new value of PPS2 is limited or reset to PPS2_PREV+PPS1_ROC as indicated by step 136. Alternatively, if the answer is No then PPS2_RAW is allowed to become the new value for PPS2 as indicated by step 138. Thus the new values of PPS1 and PPS2 have now either been verified to be the "RAW" values indicated by sensors 16 and 18 or they have been limited in magnitude. If either or both of PPS1 and/or PPS2 is magnitude limited then the limited signal(s) prevents an undesirable amount of engine acceleration when PPS and PPS2 are later averaged by method 120 to provide the magnitude for the throttle control signal PPS_AVG.

Generally, method 120 further determines if the absolute value of the difference between the magnitudes of PPS1 and PPS2 becomes greater than the value of a correlation threshold "Corr_Thres" then a sensor related fault is determined to have occurred. Undesired Vref magnitude shifts are more common in the decreasing direction than in the increasing direction due to the probability of temporary increased loading of the Vref circuit. A decrease in the magnitude of Vref results in an increase in the magnitude of PPS2_RAW curve 104 due to the negative slope thereof. The decrease in magnitude of Vref also tends to force the magnitude of PPS2 to be higher than the magnitude of PPS1. For instance with equal weighting of PPS1 and PPS2 a Vref shift of 89 milli-volts could change PPS2 by 5% and PPS1 by 2.5%. But since PPS2 is weighted less than PPS1 in the calculation PPS_AVG performed later by method 120 a higher correlation threshold value can be tolerated in this case. This means the correlation threshold should be smaller if PPS1 has a greater magnitude than PPS2.

Thus decision step 140 of FIG. 4 determines whether PPS1 is greater than PPS2. If the answer is "Yes" then one or both sensors 16 and 18 may not be operating as expected. Accordingly, a relatively lower or "tighter" value of Corr_Thres 1=Cal 2+(Cal 3*PPS2) is calculated in step 142. The asteric "*" indicates multiplication. Alternatively if PPS1 is not greater than PPS2 then a relatively higher value or "looser" value of Corr_Thres 2=Cal 4+(Cal 5*PPS1) is calculated in step 144. Cals 2, 3 and 4 each are calibratable offsets. Corr_Thres1 is less than Corr_Thres2 because the value of Cal 2 is less than that of Cal 4 and the value of Cal 3 is less than Cal 5.

Decision step 146 determines whether the absolute value "ABS" of the difference between PPS1 and PPS2 is greater than the Corr_Thres determined by step 140. If the answer is "Yes" then a PPS out of correlation flag "PPS_OOC" is created per step 148. Also this flag is generated if a PPS_OOC FAULT is already latched for the present ignition cycle because of a previous X out Y diagnostic from a previous cycle in a manner known in the art. In either case the magnitude of the throttle control signal "PPS_TCS" is set in step 150 to whichever of PPS1 or PPS2 has the smaller magnitude to limit the magnitude of PPS_TCS. The PCS_TCS signal is utilized by step 154 to provide an output control signal for operating a device such as motor 112 of FIG. 1 for controlling the function of positioning valve 38 to affect the amount of air flow into engine 14. The limiting of the magnitude of PPS_TCS thus desirably limits the acceleration of the engine 14.

The PCS_TCS SIGNAL is also utilized by diagnostic step 155 which can employ a standard "X out of Y" diagnostic to determine whether a major fault has occurred. If more than a predetermined number of PCS_TCS signals occur over a predetermined time or if too high percentage of such signals occurs then a major fault is determined to have occurred in one or both sensors 16 and 18 and corrective action must be taken. Otherwise the faults are tolerated. If diagnostic step 155 of method 120 indicates that at least one of the accelerator sensors 16 or 18 is sufficiently operative such corrective action can include the initiation of a "limp home" mode which results in reduced vehicle acceleration capability. Alternatively, if the diagnostic step 155 of method 120 indicates that neither of the accelerator sensors 16 nor 18 are sufficiently operative because they have shorted together, for instance then the corrective action can be the initiation of an "idle only" mode for engine 14. In either case a dashboard warning light indication or other warning is provided and an immediate trip to a repair facility might be required.

If the answer to decision step 146 is No then the sensors 16 and 18 appear to operating as expected. Accordingly step 150 provides a flag 160 reflecting that the sensor signal PPS1 and PPS2 are in correlation as indicated by "PPS_OOC=FALSE". Also in accord with step 162 the throttle control signal applied to throttle control driver 29 is set to PPS_AVG=(W*PPS1+PPS2)/(W+1) where W is the weighting factor for PPS1. PPS_AVG is also utilized by step 154 to provide an output control signal for operating a device such as motor 42 of FIG. 1 for controlling the function of positioning valve 38 to affect the amount of air flow into engine 14.

The weighting of PPS1 makes the correlation diagnostic or Corr_Thres a little more sensitive to PPS1 shifts i.e. 3.75% at idle and 7.5% at wide-open throttle "WOT" versus 5% at idle and 10% at WOT, for example. However Vref shifts no longer affects PPS2 as much as in the equal weighting case. Due to the unequal weighting, PPS2 will have to shift 7.5% at idle or 15% at WOT to generate a correlation fault for instance. Since it is not known which sensor is defective, a PPS2 shift in one direction appears like a PPS1 shift in the other direction. This problem is addressed by using the different values of the Corr_thres based on the sign of the correlation error as previously described. The sign of the correlation error is determined by comparing the magnitudes of PPS1 and PPS2 as described above with respect to steps 140, 142 and 144. Also, since Vref shifts are more common in the decreasing direction this results in an increase in PPS2 due to the negative slope thereof. Thus PPS2 is forced to have a greater magnitude than PPS1. But since PPS2 is weighted less than PPS1, a higher correlation threshold is tolerated in this case as previously mentioned.

Figure 5:
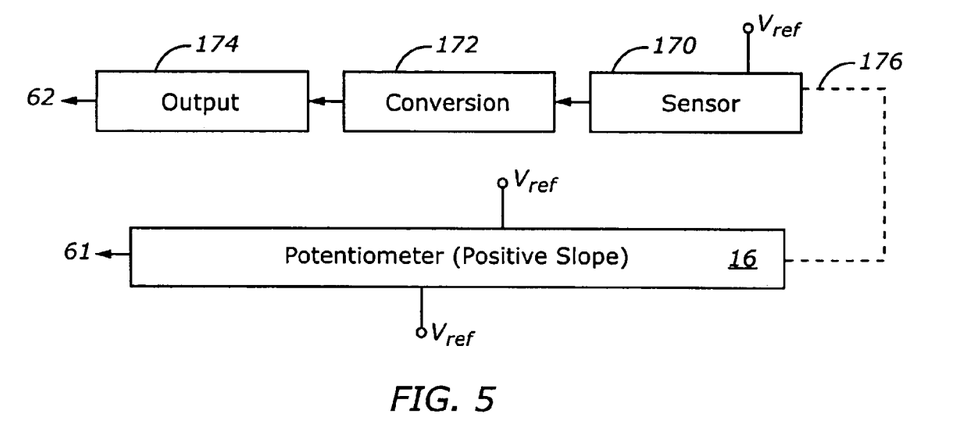
FIG. 5 shows an alternative accelerator pedal sensor configuration using an analog sensor and a non-analog sensor.

Sensors 16 and 18 as shown in FIG. 2 of the same analog technology type tend to have common modes of failure. For instance it is possible that potentiometer resistors 70 and 72 of FIG. 2 could short together. In accordance with another aspect of an embodiment of the invention, it is proposed that one or both of sensors 16 and 18 be replaced by a sensor or sensors of a different technology type or types. This tends to avoid the common failure modes and to provide other advantages such as providing even more isolation from temporary shifts in the magnitude of Vref. FIG. 5 shows sensor 18 of FIG. 2 being replaced by sensor 170, which could be a contact-less Hall Effect sensor or by an inductively coupled sensor, for instance. Conversion circuitry 172 couples sensor 170 to output circuit 174 that is connect to input line 62 for I/O module 45 of FIG. 1. The output circuit 174 can include a single or multiple application specific integrated circuits "ASICS" to achieve increase accuracy. Common control shaft 19 continues to couple the paired sensors 16 and 170 together as indicated by dashed line 176. Vref is also connected to both sensors. Either sensor 16 or 170 can be made to have higher tolerances than the other sensor. If sensor 16 is made more precisely and has higher tolerances than sensor 170 then sensor 16 is the control sensor. Accordingly sensor 16 will continue to be weighted to provide the above mentioned benefits such as further reducing sensitivity to Vref and thereby enabling diagnostic sensor 170 to be less precise and thus less expensive. Thus the embodiment of FIG. 5 allows an increasing number of choices for sensor technologies and suppliers. This multiple technology approach can also be utilized for other applications of multiple sensors, which have a need for reducing the impact of common failure modes.

Figure 6:
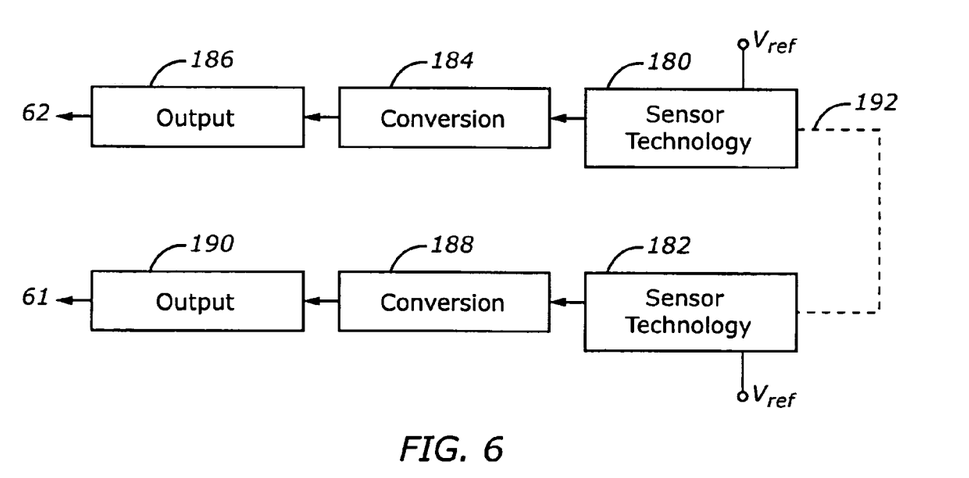
FIG. 6 shows still another alternative accelerator pedal sensor configuration using non-analog sensors.

FIG. 6 shows still another alternative embodiment where both sensors 16 and 18 are replaced with non-analog sensors 180 and 182 of different technology types. Sensor 180 is coupled through conversion circuit 184 and output circuit 186 to line 62. Similarly sensor 182 is coupled through conversion circuit 188 and output circuit 190 to line 61. Output circuits 186 and 190 can again include a single or multiple ASICS to achieve increase accuracy. Sensors 180 and 182 are coupled together as indicated by dashed line 192. Also Vref is again connected to both sensors. Either sensor 180 and 182 can be a high accuracy digital pulse width modulation sensor or a digital frequency sensor that is made more precisely than the other redundant sensor of the pair. Another type for sensor 180 or 182 can utilize "Giant Magneto Resistive" technology as known in the art. The more precise of the dual sensors 180 or 182 as previously explained, will be more highly weighted relative to the other sensor when calculating the output control signal. This provides the above mentioned benefits such as reducing sensitivity to Vref and enabling the other sensor to be less precise and thus less expensive.

Thus a method 120 and apparatus 10 has been described for providing continuous reliable detection to facilitate notification that a redundant sensor such as sensor 16 or 18 either is failing or has failed. Moreover such system and method are tolerant of acceptable correlation errors in the magnitudes of the sensor output signals which can result from allowable physical variations between sensors, and/or a minor fault in a sensor. The method 120 and apparatus 10 enables at least one of sensors 16 or 18 to have less restrictive tolerances thus reducing the cost of such sensor. Hence at least one of the sensors can be less expensive than otherwise would be the case which facilitates the use of existing sensors. Furthermore, such apparatus and method tolerates to temporary disturbances or noise such as temporary changes in the magnitude of Vref caused by the loading of the reference power supply. The apparatus and method limits the magnitude of the throttle control signal applied to throttle 12 and thereby keeps engine 14 acceleration within acceptable limits, for instance. This enables the continued uses of present reference voltage supplies that might otherwise have to be redesigned. Such method and apparatus require either no or only minimal changes in other portions of the overall system such as wiring changes.

While at least one exemplary embodiment has been presented in the foregoing detailed description, it should be appreciated that a vast number of variations exist. It should also be appreciated that these exemplary embodiments are only examples, and are not intended to limit the scope, applicability, or configuration of the invention in any way. Rather, the foregoing detailed description provides those skilled in the art with a convenient road map for implementing an exemplary embodiment of the invention. It being understood that various changes may be made in the function and arrangement of elements described in any exemplary embodiment without departing from the spirit and scope of the invention as set forth in the appended claims and the legal equivalents thereof.

What is claimed is:

1. An apparatus for generating a vehicle control signal that controls a function of a vehicle device associated with a sensed event, the apparatus comprising:
   a first sensor configured to provide a first sensor output signal having a first magnitude that approximately corresponds to the sensed event with a first level of accuracy, wherein the sensed event is actuation of an input control mechanism by an operator;
   a second sensor configured to provide a second sensor output signal having a second magnitude that approximately corresponds to the sensed event with a second level of accuracy that is less than said first level of accuracy;
   a processor configured to receive said first sensor output signal and said second sensor output signal, and said processor being arranged to:
      calculate a magnitude for the vehicle control signal based on an average of a weighted value of said first magnitude of said first sensor output signal and said second magnitude of said second sensor output signal;
      generate the vehicle control signal with said magnitude; and
      provide the vehicle control signal to the vehicle device for controlling the function of the vehicle device associated with the sensed event monitored by the first sensor and the second sensor in response to the vehicle output signal with said magnitude.

2. The apparatus of claim 1 wherein said first sensor is a first technology type and said second sensor is a second technology type other than said first technology type.

3. The apparatus of claim 2 wherein said first sensor is an analog sensor comprising at least one resistive element and said second sensor comprises a Hall Effect component.

4. The apparatus of claim 1 wherein one at least one of said first sensor and said second sensor comprise a giant magneto resistive component.

5. The apparatus of claim 1 wherein at least one of said first sensor and said second sensor is an analog sensor.

6. The apparatus of claim 1 wherein said first sensor and said second sensor monitor the displacement of an accelerator control mechanism that is configured to control a position of a throttle valve located in an air intake path of an internal combustion engine.

7. The apparatus of claim 1 wherein said processor is further arranged to:
calculate a difference between said first magnitude and said second magnitude;
compare said difference to a correlation threshold;
calculate said magnitude for the vehicle control signal based on the average of said weighted value of said first magnitude and said second magnitude if said difference is less than said correlation threshold; and
generate said vehicle control signal with said magnitude substantially equal to the lesser of said first magnitude and said second magnitude if said difference is greater than said correlation threshold.

8. The apparatus of claim 7 further wherein said processor is further configured to:
compare said first magnitude and said second magnitude;
provide said correlation threshold of a third magnitude if said first magnitude is greater than said than said second magnitude; and
provide said correlation threshold of a fourth magnitude if said first magnitude is less than said second magnitude.

9. The apparatus of claim 1 wherein said first sensor is coupled to said second sensor such that said first magnitude is changed substantially simultaneously with said second magnitude in response to the change in the sensed event.

10. The apparatus of claim 1 wherein said second magnitude has a second rate of change corresponding to the change in the sensed event, and said processor is further configured to:
sum said first magnitude and said second rate of change at a first time to produce a third magnitude;
determine if said first magnitude at a second time after said first time is greater than said third magnitude;
utilize said first magnitude at said second time during said calculation of said magnitude of said vehicle control signal if said first magnitude at said second time is less than said third magnitude; and
utilize said third value as said first magnitude during said calculation of said magnitude of said vehicle control signal if said first magnitude at said second time is less than said third magnitude.

11. The apparatus of claim 1 wherein said first magnitude has a first rate of change corresponding to the change in the sensed event, and said processor is further configured to:
sum said second magnitude and said first rate of change at a first time to produce a third magnitude;
determine if said second magnitude at a second time after said first time is greater than said third magnitude;
utilize said second magnitude at said second time during said calculation of said magnitude of said vehicle control signal if said second magnitude at said second time is less than said third magnitude; and
utilize said third value as said second magnitude during said calculation of said magnitude of said vehicle control signal if said second magnitude at said second time is less than said third magnitude.

12. The apparatus of claim 1 wherein said weighted value of said magnitude of said first sensor output signal is greater than one.

13. A method of generating a vehicle control signal that controls a function of a vehicle device associated with a sensed event, the method comprising the steps of:
producing a first sensor output signal having a first magnitude that approximately corresponds to the sensed event with a first level of accuracy; wherein the sensed event is actuation of an input control mechanism by an operator;
producing a second sensor output signal having a second magnitude that approximately corresponds to the sensed event with a second level of accuracy that is less than said first level of accuracy;
calculating a magnitude for the vehicle control signal based on an average of a weighted value of said first magnitude of said first sensor output signal and said second magnitude of said second sensor output signal;
generating the vehicle control signal with said magnitude; and
providing the vehicle control signal to the vehicle device for controlling the function of the vehicle device associated with the sensed event monitored by the first sensor and the second sensor in response to the vehicle output signal with said magnitude.

14. The method of claim 13 wherein said first sensor is a first technology type and said second sensor is a second technology type other than said first technology type.

15. The method of claim 14 wherein said first sensor is an analog sensor comprising at least one resistive element and said second sensor comprises a Hall Effect component.

16. The method of claim 13 wherein one at least one of said first sensor and said second sensor comprise a giant magneto resistive component.

17. The method of claim 13 wherein at least one of said first sensor and said second sensor is an analog sensor.

18. The method of claim 13, further comprising the steps of:
calculating a difference between said first magnitude and said second magnitude;
comparing said difference to a correlation threshold;
calculating said magnitude for the vehicle control signal based on the average of said weighted value of said first magnitude and said second magnitude if said difference is less than said correlation threshold; and
generating said vehicle control signal with said magnitude substantially equal to the lesser of said first magnitude and said second magnitude if said difference is greater than said correlation threshold.

19. The method of claim 18, further comprising the steps of:
comparing said first magnitude and said second magnitude;
providing said correlation threshold of a third magnitude if said first magnitude is greater than said than said second magnitude; and
providing said correlation threshold of a fourth magnitude if said first magnitude is less than said second magnitude.

20. The method of claim 13, further comprising the step of changing said first magnitude substantially simultaneously with said second magnitude in response to the change in the sensed event.

21. The method of claim 13 wherein said second magnitude has a second rate of change corresponding to the change in the sensed event, and said method further comprising the steps of:
summing said first magnitude and said second rate of change at a first time to produce a third magnitude;

determining if said first magnitude at a second time after said first time is greater than said third magnitude;

utilizing said first magnitude at said second time during said calculation of said magnitude of said vehicle control signal if said first magnitude at said second time is less than said third magnitude; and utilizing said third value as said first magnitude during said calculation of said magnitude of said vehicle control signal if said first magnitude at said second time is less than said third magnitude.

22. The method of claim 13 wherein said first magnitude has a first rate of change corresponding to the change in the sensed event, and said method further comprising the steps of:

summing said second magnitude and said first rate of change at a first time to produce a third magnitude;

determining if said second magnitude at a second time after said first time is greater than said third magnitude;

utilizing said second magnitude at said second time during said calculation of said magnitude of said vehicle control signal if said second magnitude at said second time is less than said third magnitude; and utilizing said third value as said second magnitude during said calculation of said magnitude of said vehicle control signal if said second magnitude at said second time is less than said third magnitude.

23. An apparatus for generating an automobile control signal that controls a function of an internal combustion engine, the apparatus comprising:

a first sensor configured to provide a first sensor output signal having a first magnitude with a first level of accuracy that approximately corresponds to a displacement of an accelerator control mechanism;

a second sensor configured to provide a second sensor output signal having a second magnitude with a second level of accuracy that approximately corresponds to the displacement of the accelerator control mechanism;

a processor configured to receive said first sensor output signal and said second sensor output signal, and said processor being arranged to:

calculate a magnitude for the automobile control signal based on an average of a weighted value of said first magnitude of said first sensor output signal and said second magnitude of said second sensor output signal;

generate the automobile control signal with said magnitude; and provide the automobile control signal to the internal combustion engine.

* * * * *